United States Patent [19]

Sasaki

[11] Patent Number: 5,562,972
[45] Date of Patent: *Oct. 8, 1996

[54] CONDUCTIVE PASTE AND SEMICONDUCTOR CERAMIC COMPONENTS USING THE SAME

[75] Inventor: Kiyomi Sasaki, Oumihachiman, Japan

[73] Assignee: Murata Manufacturing Co., Ltd., Nagaokakyo, Japan

[*] Notice: The term of this patent shall not extend beyond the expiration date of Pat. No. 5,358,666.

[21] Appl. No.: 499,725

[22] Filed: Jul. 7, 1995

[30] Foreign Application Priority Data

Jul. 8, 1994 [JP] Japan .................................. 6-157342

[51] Int. Cl.$^6$ ........................................... C03C 8/18
[52] U.S. Cl. ............................ 428/209; 501/19; 501/32; 252/512; 252/518; 427/58; 427/372.2; 428/210; 428/697; 428/699; 428/701; 428/702; 428/432; 428/426; 174/257
[58] Field of Search .................................. 501/17, 19, 32, 501/77, 72; 252/512, 518; 427/58, 372.2, 443.2; 428/209, 210, 457, 688, 689, 426, 697, 699, 701, 702, 432; 174/257

[56] References Cited

U.S. PATENT DOCUMENTS

| | | | |
|---|---|---|---|
| 3,203,815 | 8/1965 | Michael | 501/19 |
| 3,772,043 | 11/1973 | Michael | 501/19 |
| 4,039,721 | 8/1977 | Weitze et al. | 252/512 |
| 4,221,604 | 9/1980 | Chirino et al. | 501/19 |
| 4,537,703 | 8/1985 | Hormadaly | 501/17 |
| 4,699,831 | 10/1987 | Hartmann et al. | 501/32 |
| 5,344,592 | 9/1994 | Wilczek et al. | 252/512 |
| 5,358,666 | 10/1994 | Sasaki | 501/19 |

*Primary Examiner*—Mark L. Bell
*Assistant Examiner*—Michael Marcheschi
*Attorney, Agent, or Firm*—Burns, Doane, Swecker & Mathis, LLP

[57] ABSTRACT

A conductive paste capable of forming an excellent moisture-resistant electrode with a favorable ohmic contact formed between the electrode and the semiconductor element, said conductive paste comprising an aluminum powder and a glass frit containing at least one compound selected from the group consisting of barium borosilicate and calcium borosilicate as the principal component thereof, said glass frit accounting for 5 to 40% by weight with respect to the aluminum powder. Also claimed is a semiconductor ceramic component using the same.

12 Claims, No Drawings

CONDUCTIVE PASTE AND SEMICONDUCTOR CERAMIC COMPONENTS USING THE SAME

BACKGROUND OF THE INVENTION

1. Field of the Invention

The present invention relates to an electrically conductive paste for use in fabricating electrodes having an ohmic contact on a semiconductor ceramic component such as a positive temperature coefficient (PTC) and the like, and to a semiconductor ceramic component using the same.

2. Background of the Invention

An electrode material capable of forming ohmic contacts have been utilized in various types of semiconductor ceramic elements using, for example, perovskite-type semiconductor ceramics such as barium titanate, zinc oxide-type semiconductor ceramics, or iron oxide-type semiconductor ceramics.

Electrode materials capable of forming an ohmic contact include an indium-gallium (In-Ga) alloy, a nickel film formed by electroless-plating, or an ohmic conductive paste. An ohmic conductive paste comprises a powder of a non-metallic element (e.g., zinc (Zn), aluminum (Al), or nickel (Ni)) as the electrically conductive component with a glass frit having a low melting point based on lead borosilicate or zinc borosilicate added therein.

More specifically, in case of using a conductive paste, an electrically conductive paste is prepared by dispersing a powder of a non-metallic element (e.g., Zn, Al, or Ni) and a powder of lead borosilicate glass frit or zinc borosilicate glass frit in an organic vehicle previously prepared by dissolving a binder resin in an organic solvent. Then, the electrically conductive paste thus obtained is applied to a semiconductor ceramic element, dried, and baked to remove organic components therefrom. Thus, an electrode having an ohmic contact (sometimes referred to simply hereinafter as "an ohmic contact electrode") and comprising an electrically conductive component and a glass frit is formed on the semiconductor element.

However, when a conventional ohmic contact electrode using a conductive paste is employed as an electrode of a semiconductor ceramic element such as a positive temperature coefficient (PTC) thermistor, for instance, the following problems have yet to be overcome.

A conventional ohmic contact electrode using a lead borosilicate glass frit as the glass component thereof is inferior in moisture resistance. Accordingly, a high resistance layer of an oxide and the like tends to form easily on the surface of the electrode. Thus, in case of a structure comprising a metallic contact pressure-welded to the electrode of a PTC thermistor, e.g., a PTC thermistor for a heater, a high resistance layer formed between the electrode and the metallic contact impairs the reliability of the PTC thermistor.

Furthermore, the electrodes obtained heretofore are porous. Thus, the resistance of the ohmic contact formed at the boundary between the PTC thermistor and the electrode tends to increase due to the absorbed moisture. This also lowers the reliability of the PTC thermistor.

Moreover, in the case when a glass frit based on zinc borosilicate is used as the glass component of the electrode, the glass frit undergoes reaction with a PTC thermistor element lowering the resistance of the element. This reduces the electrical-thermal conversion coefficient of a PTC thermistor when used in a heater.

Accordingly, an object of the present invention is to provide an electrically conductive paste which enables a moisture-resistant electrode capable of implementing a favorable ohmic contact when applied and baked on a semiconductor ceramic element. It is also an object of the present invention to provide a semiconductor ceramic component using the same.

SUMMARY OF THE INVENTION

According to a first aspect of the present invention, there is provided a conductive paste including an aluminum powder and a glass frit containing at least one compound selected from the group consisting of barium borosilicate and calcium borosilicate as the principal component thereof. The glass frit accounts for 5 to 40% by weight of the paste with respect to the aluminum powder.

According to a second aspect of the present invention, there is provided a semiconductor ceramic component including a semiconductor ceramic element having thereon an electrode comprising an aluminum powder and a glass frit containing at least one compound selected from the group consisting of barium borosilicate and calcium borosilicate as the principal component thereof. The glass frit accounts for 5 to 40% by weight of the ceramic component with respect to the aluminum powder.

According to another aspect of the present invention, there is provided a PTC thermistor as the semiconductor ceramic element above.

By using the conductive paste according to the present invention, an electrode can be formed on a semiconductor ceramic element. The electrode comprises aluminum as the conductive component for forming an ohmic contact and glass containing at least one compound selected from the group consisting of barium borosilicate and calcium borosilicate as the principal component thereof.

Accordingly, an ohmic contact can be formed between the electrode thus obtained and the semiconductor ceramic element. The electrode exhibits excellent resistance against moisture. Furthermore, in forming the structure above, reactions which lower the resistance of the ceramic element are prevented from occurring between the electrode and the semiconductor ceramic electrode.

DETAILED DESCRIPTION OF THE PREFERRED EMBODIMENTS

The present invention is described in further detail below by referring to non-limiting examples. PTC thermistors are specifically referred below as illustrative examples for the conductive paste and the semiconductor ceramic components according to the present invention.

As the components constituting the conductive paste for use as the electrode material, an aluminum powder consisting of particles 10 μm in average diameter and four types of glass frit each consisting of particles 10 μm in average diameter were prepared. Thus, glass frits of barium borosilicate, calcium borosilicate, lead borosilicate, and zinc borosilicate were each prepared.

The glass frits were each added to the aluminum powder above in the quantity shown in Table 1. Eighty % by weight of the mixed powders thus obtained was mixed with 20% by weight of an organic vehicle, and the resulting mixture was kneaded and dispersed by means of a three-roll mill to obtain a conductive paste. The quantity of glass frit added to the aluminum powder is given in percentage by weight with respect to the total quantity of aluminum powder taken as 100%. The organic vehicle used herein was ethyl cellulose dissolved in α-terpineol.

Separately, PTC thermistor elements utilizing a 13-mm diameter disk of barium titanate semiconductor ceramics were fabricated according to a known process.

Each of the conductive pastes prepared by mixing the conductive component with the glass frit at the mixing ratio given in Table I was applied by means of screen printing to the both surfaces of the PTC thermistor element thus obtained, and was baked in air at 600° C. for a duration of 30 minutes. Complete PTC thermistor elements were obtained by utilizing each of the conductive pastes prepared above.

The resistance between the electrodes at 25° C. was measured on each of the resulting PTC thermistor elements by means of an ohmmeter to give the initial resistance for each of the PTC thermistors. Furthermore, the resistance of a PTC thermistor element itself was also measured by forming electrodes on both surfaces of the PTC thermistor element; not by baking, but by friction welding an In-Ga alloy to form an ohmic contact between the electrodes and the surfaces of the element. The results are given in Table 1. The PTC thermistor elements falling out of the scope of claims in the present invention are marked with an asterisk (*).

Subsequently, the PTC thermistor elements obtained by forming electrodes using the conductive pastes prepared above were each subjected to pressure cooker test (PCT) at 121° C. for a duration of 20 hours under a pressure of 2 atm with water vapor. The surface of each of the resulting PTC thermistor elements was observed under an optical microscope at a magnification of 5 to 10 times to find whether the surface of the electrode was oxidized. At the same time, the resistance between the electrodes at 25° C. was measured to obtain the ratio in change of resistance by taking the initial resistance as the standard value. The results are given in Table 1.

TABLE 1

| Sample No. | Electrode Material | | | Initial Resistance (Ω) | After Pressure Cooker Test | |
|---|---|---|---|---|---|---|
| | Conductive Component | Glass Frit | | | Ratio in Change of Resistance (%) | Oxidized Film on the Electrode Surface |
| | | Element(s) | Amount (Wt. %) | | | |
| *1 | Al | B | 2 | 170 | +240 | found |
| 2 | Al | B | 5 | 125 | +50 | not found |
| 3 | Al | B | 10 | 107 | +20 | not found |
| 4 | Al | B | 25 | 105 | +15 | not found |
| 5 | Al | B | 40 | 121 | +12 | not found |
| *6 | Al | B | 60 | 205 | +2 | not found |
| *7 | Al | C | 2 | 180 | +245 | found |
| 8 | Al | C | 5 | 128 | +53 | not found |
| 9 | Al | C | 10 | 112 | +25 | not found |
| 10 | Al | C | 40 | 127 | +18 | not found |
| *11 | Al | C | 60 | 210 | +6 | not found |
| 12 | Al | B/C = 1/1 (wt. ratio) | 25 | 108 | +17 | not found |
| *13 | Al | P | 25 | 98 | +150 | found |
| *14 | Al | Z | 25 | 48 | +10 | not found |
| *15 | In-Ga | — | — | 100 | — | — |

B: Barium Borosilicate
C: Calcium Borosilicate
P: Lead Borosilicate
Z: Zinc Borosilicate Table 1 clearly shows that the PTC thermistors having thereon the electrodes formed by using the conductive paste according to the present invention (i.e., samples Nos. 2 to 5, Nos. 8 to 10, and No. 12) yield approximately the same resistance as the PTC thermistor element itself. It can be seen therefore that no reaction which lowers the resistance of the PTC thermistor occurs during fabrication of the electrode, and that an ohmic contact is formed. Moreover, according to the evaluation results of the PCT, no oxide film was observed to form on the surface of the electrode. The ratio in change of resistance after the test was found to yield a stable value in a range of from +2 to +53%.

In contrast to the results above, in the PTC thermistor element obtained by using a conventional paste containing a lead borosilicate glass frit (sample No. 13), an oxide film was found to generate on the surface of the electrode upon subjecting the element to the PCT. The ratio in change of resistance was found to be as high as +150%. Furthermore, in the PTC thermistor element obtained by using a conventional paste containing a zinc borosilicate glass frit (sample No. 14), the glass frit was found to undergo reaction with the PTC thermistor element as to lower the resistance of the element to about a half of the value of the PTC thermistor element itself.

In the PTC thermistors according to the present invention, either or both of barium borosilicate glass frit and calcium borosilicate glass frit are added at an amount of from 5 to 40% by weight with respect to aluminum powder.

As illustrated by samples No. 1 and No. 7, if the glass frit is added at an amount of less than 5% by weight with respect to aluminum powder, the moisture resistance of the electrode becomes inferior as to allow an oxide film to generate on the surface of the electrodes upon effecting the PCT and to greatly increase the resistance. On the other hand, as illustrated by samples No. 6 and No. 11, the contact between the aluminum grains becomes disturbed by the glass frit component if the amount of the glass frit increases as to account for more than 40% by weight. In such a case, the conductivity of the electrodes thus formed becomes impaired as to unfavorably increase the resistance between the electrodes.

By utilizing the conductive paste according to the present invention to form an electrode for a PTC thermistor, as described above, a favorable ohmic contact can be formed between the electrode and the PTC thermistor. Moreover, the electrode is greatly improved in moisture resistance.

In the above examples, explanation was made specifically on PTC thermistors using a barium titanate based semiconductor ceramics as the semiconductor ceramic components. However, the present invention is not only limited thereto, and other perovskite-type semiconductor ceramics, zinc oxide based semiconductor ceramics, iron oxide based semiconductor ceramics, etc., can be used as well in the place of the barium titanate semiconductor ceramics.

As described in the foregoing, the conductive paste according to the present invention comprises an aluminum powder as an electrically conductive component for forming an ohmic contact between the semiconductor ceramic element and the electrode, and a glass frit containing at least one compound selected from the group consisting of barium borosilicate and calcium borosilicate as the principal component thereof.

By using the conductive paste according to the present invention, an electrode having favorable moisture resistance and having the capability of forming an ohmic contact can be obtained on a semiconductor ceramic element.

Furthermore, a highly reliable semiconductor ceramic component having a favorable ohmic contact, and having less change in resistance of the semiconductor ceramic element and the electrode can be obtained.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A semiconductor ceramic component comprising a semiconductor ceramic element having thereon an electrode comprising an aluminum powder and a glass frit containing at least one compound selected from the group consisting of barium borosilicate, calcium borosilicate and mixtures thereof as the principal component of said glass frit, said glass frit accounting for 5 to 40% by weight with respect to the aluminum powder.

2. The semiconductor ceramic component as in claim 1, wherein the semiconductor ceramic element is a positive temperature coefficient thermistor element.

3. The semiconductor ceramic component as in claim 2, wherein the glass frit comprises barium borosilicate.

4. The semiconductor ceramic component as in claim 2, wherein the glass frit comprises calcium borosilicate.

5. The semiconductor ceramic component as in claim 2, wherein the glass frit comprises a mixture of barium borosilicate and calcium borosilicate.

6. The semiconductor ceramic component as in claim 2, wherein the thermistor element does not form an oxidized film when heated to 121° C. for 20 hours under a pressure of 2 atm with water vapor.

7. The semiconductor ceramic component as in claim 2, wherein the thermistor element has a ratio in change of resistance of about 2 to about 53 after heating to 121° C. for 20 hours under a pressure of 2 atm with water vapor.

8. A method for making a positive temperature coefficient thermistor element, comprising preparing a conductive paste by mixing an aluminum powder and a glass frit, said glass frit containing at least one compound selected from the group consisting of barium borosilicate and calcium borosilicate as the principal component of said glass frit, applying said conductive paste to a surface of a semiconductor ceramic and heating the conductive paste.

9. The method as in claim 8, wherein said frit accounts for 5 to 40% by weight of said conductive paste based upon the amount of aluminum powder.

10. The method as in claim 8, wherein said semiconductor ceramic is a perovskite semiconductor ceramic, zinc oxide semiconductor ceramic or iron oxide semiconductor ceramic.

11. The method as in claim 10, wherein said semiconductor ceramic is a perovskite semiconductor ceramic.

12. The method as in claim 11, wherein said perovskite semiconductor ceramic is a barium titanate semiconductor ceramic.

* * * * *